US012280300B1

(12) United States Patent
Tabares

(10) Patent No.: US 12,280,300 B1
(45) Date of Patent: Apr. 22, 2025

(54) AUTOMATIC GOLF BALL RETRIEVAL SYSTEM

(71) Applicant: Mauricio Tabares, Milford, CT (US)

(72) Inventor: Mauricio Tabares, Milford, CT (US)

( * ) Notice: Subject to any disclaimer, the term of this patent is extended or adjusted under 35 U.S.C. 154(b) by 206 days.

(21) Appl. No.: 17/858,928

(22) Filed: Jul. 6, 2022

Related U.S. Application Data

(60) Provisional application No. 63/218,797, filed on Jul. 6, 2021.

(51) Int. Cl.

| | |
|---|---|
| ***A63B 47/02*** | (2006.01) |
| ***A63B 47/04*** | (2006.01) |
| ***A63B 57/00*** | (2015.01) |
| ***A63B 69/36*** | (2006.01) |
| ***B08B 3/04*** | (2006.01) |
| ***B08B 13/00*** | (2006.01) |

(52) U.S. Cl.
CPC ............ *A63B 47/025* (2013.01); *A63B 47/04* (2013.01); *A63B 57/0006* (2013.01); *B08B 3/04* (2013.01); *B08B 13/00* (2013.01); *A63B 2047/043* (2013.01); *A63B 2047/046* (2013.01); *A63B 69/3694* (2013.01)

(58) Field of Classification Search
None
See application file for complete search history.

(56) References Cited

U.S. PATENT DOCUMENTS 5,331,702 A * 7/1994 Willsey .................. A63B 47/04 15/3.16
5,513,841 A * 5/1996 Takagi ............... A63B 69/3694 473/168

* cited by examiner

*Primary Examiner* — Rita P Adhlakha
(74) *Attorney, Agent, or Firm* — John Rizvi; John Rizvi, P.A.—The Patent Professor®

(57) ABSTRACT

An automatic golf ball retrieval system comprises a mat, a conveyor belt system, a cleaning system, an automatic tee setter system, and a processor. The mat includes front, middle and back portions, leftmost and rightmost sides, an exterior face and an interior face. The conveyor belt system comprises at least two frames and a rolling bar which moves between upper and lower ends of the at least two frames. The rolling bar forms a raised surface on the exterior face of the mat which engages and pushes the golf balls towards a base which receives and transfers the golf balls to a cleaning system located below the conveyor belt system which cleans the golf balls, an automatic tee setter system transfers at least one golf ball onto a tee from the cleaning system.

20 Claims, 9 Drawing Sheets

AUTOMATIC GOLF BALL RETRIEVAL SYSTEM

CROSS-REFERENCE TO RELATED APPLICATION

This application claims the benefit of U.S. Provisional Patent Application Ser. No. 63/218,797 filed on Jul. 6, 2022, which is incorporated by reference herein in its entirety.

FIELD OF THE INVENTION

The present invention relates generally to an automatic golf ball retrieval system, and more particularly, to an automatic golf ball retrieval system at a driving range.

BACKGROUND OF THE INVENTION

The game of golf has a long history, and in addition to traditional golf played on golf courses, driving ranges have been used by players to improve their game. Conventional driving ranges have been provided where golf balls are driven by a golfer within a certain driving area. The driving area may be a ground surface made of grass or artificial turf and may be surrounded by a fence and a net positioned to retain the golf balls on the driving area.

At conventional driving ranges, the golf balls driven into the driving area are picked up by personnel operated mechanical means and then distributed manually to golf ball containers. For example, at a conventional golf driving range, personnel operate golf ball pickers to collect the golf balls driven by golfers into the driving area. Such golf ball pickers may require gas or electric power for operation by personnel. Such golf ball pickup means require considerable manual labor both in picking up the golf balls as well as putting them in individual containers for furnishing them to the golfers. At conventional driving ranges, the collected golf balls are required to be cleaned or washed prior to furnishing them to the golfers adding additional machinery and manual labor to ensure the golf balls have been cleaned or washed.

At conventional driving ranges, golfers are required to manually purchase a bucket of golf balls from a cashier or machine and then the golfers are required to manually transfer the furnished golf balls to the golf tee so that the golf ball can be driven by the golfer into the driving range area. Conventional driving ranges include a personnel cashier to sell practice driving time either by time or the amount of golf balls. Golfers typically purchase golf balls with fiat money issued by a central government such as the U.S.A dollar, Japanese Yen, or other traditional fiat currency. At a conventional driving range, golfers are furnished golf balls in a bucket to transfer to a golf range teeing area. The golf range teeing area traditionally has separate areas for each golfer. The golfers tee up the golf ball by placing the golf ball onto the teeing area made of grass or artificial turf and hit the golf ball on the turf with by swinging a golf club. Golfers may also manually place a golf tee on the grass or artificial turf, then place the golf ball on the golf tee followed by swinging a golf club to hit the golf ball into the driving area. The golfer is required to manually replace the golf ball after each swing of the golf club that hits the golf ball.

When the driving area is filled with a certain amount golf balls after being hit by golfers from the teeing area, driving range personnel are employed to retrieve the golf balls to be able to continue furnishing golf balls to golfers at the driving range. Accordingly, golf ball pickup machines are utilized to retrieve and collect the golf balls landing in the driving area. The personnel must then place the collected golf balls in a cleaning system before furnishing to golfers at the driving range. The personnel at the driving range are required to monitor the amount golf balls available to golfers to determine when to collect the golf balls hit into the driving area, particularly during busy hours when many golfers are at the driving range.

Accordingly, there is need for a solution to at least one of the aforementioned problems.

SUMMARY OF THE INVENTION

The present invention is directed to an automatic golf ball retrieval system.

In a first implementation of the invention, the automatic golf ball retrieval system may comprise a mat, a conveyor belt system, a cleaning system and a computing system. The mat can comprise a front portion, a middle portion, a back portion, a leftmost side, a rightmost side, an exterior face, and an interior face. The conveyor belt system may comprise at least two frames. Each of the at least two frames may comprise an upper end and a lower end. A first conveyor belt track can be located at the upper end of each of the at least two frames. A second conveyor belt track can be located at the lower end of each of the at least two frames. A rolling bar may comprise at least two wheels that may allow the rolling bar to move between the first conveyor belt track and the second conveyor belt track. The rolling bar can contact the interior side of the mat when the rolling bar can be on the first conveyor belt track and can form a raised surface on the exterior side of the mat that may push golf balls towards the front portion of the mat and a base that can collect the golf balls. A cleaning system may be located underneath the conveyor belt system to receive the golf balls from the base and may wash the golf balls. An external placement system can be connected to the cleaning system and can store golf balls after cleaning. An ejection device may eject at least one golf ball from the external placement system. The ejection system may comprise at least two protrusions. A first protrusion may eject at least two golf balls from the ejection device into a storage device and a second protrusion may eject a single golf ball onto a tee from the ejection device. The automatic golf ball retrieval system can comprise a computing system to automate and control operation of the system.

The automatic golf ball retrieval system may comprise an energy system to power the system. The energy system may comprise of a batter, a backup generator, and a solar mechanical component comprising of solar panels and/or wind turbines. The automatic golf ball retrieval system may further comprise a geothermal system for heating and cooling water. The automatic retrieval system may comprise artificial intelligence technology, robotics, lidar, and machine learning for automation. The automatic golf ball retrieval system provides means for golfers to pay for driving practice time through fiat currency, and cryptocurrencies as payment to utilize the system.

In another aspect, the automatic golf ball retrieval system may be located at a golf driving range comprising a golf tee platform near the front end of the automatic golf ball retrieval system, an energy system below the automatic golf ball retrieval system, and a holding tank below the golf tee platform. The automatic golf ball retrieval system retrieves the golf balls towards the front end and fall into the holding tank below the golf tee platform where the golf balls can be cleaned, washed, and/or dried. The cleaned golf balls are then transferred to from the holding tank to a golf ball lane that may comprise of an automatic tee setter which may raise a clean golf ball onto a golf tee in one of the golf tee lanes on the golf tee platform.

In another aspect, the batteries and/or backup generators may be situated underground and below the automatic golf ball retrieval system. The energy system may be connected to synthetic graphite solar panels and/or wind turbines.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper." "lower," "left." "rear." "right," "front," "vertical," "horizontal." and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an automatic golf ball retrieval system.

Figure 1:
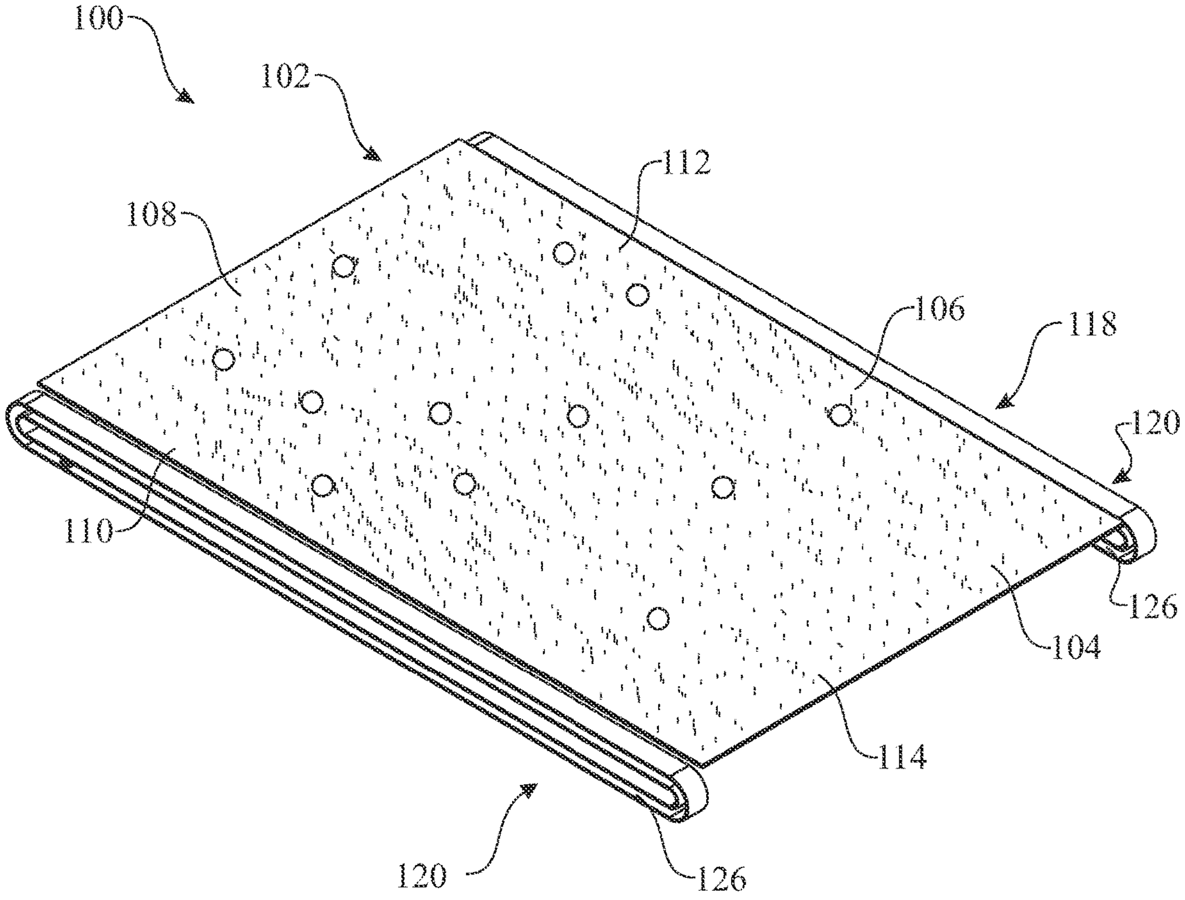
FIG. 1 presents a front perspective view of an exemplary embodiment of a mat of an automatic golf ball retrieval system, in accordance with a first illustrative embodiment of the present invention.
Figure 2:
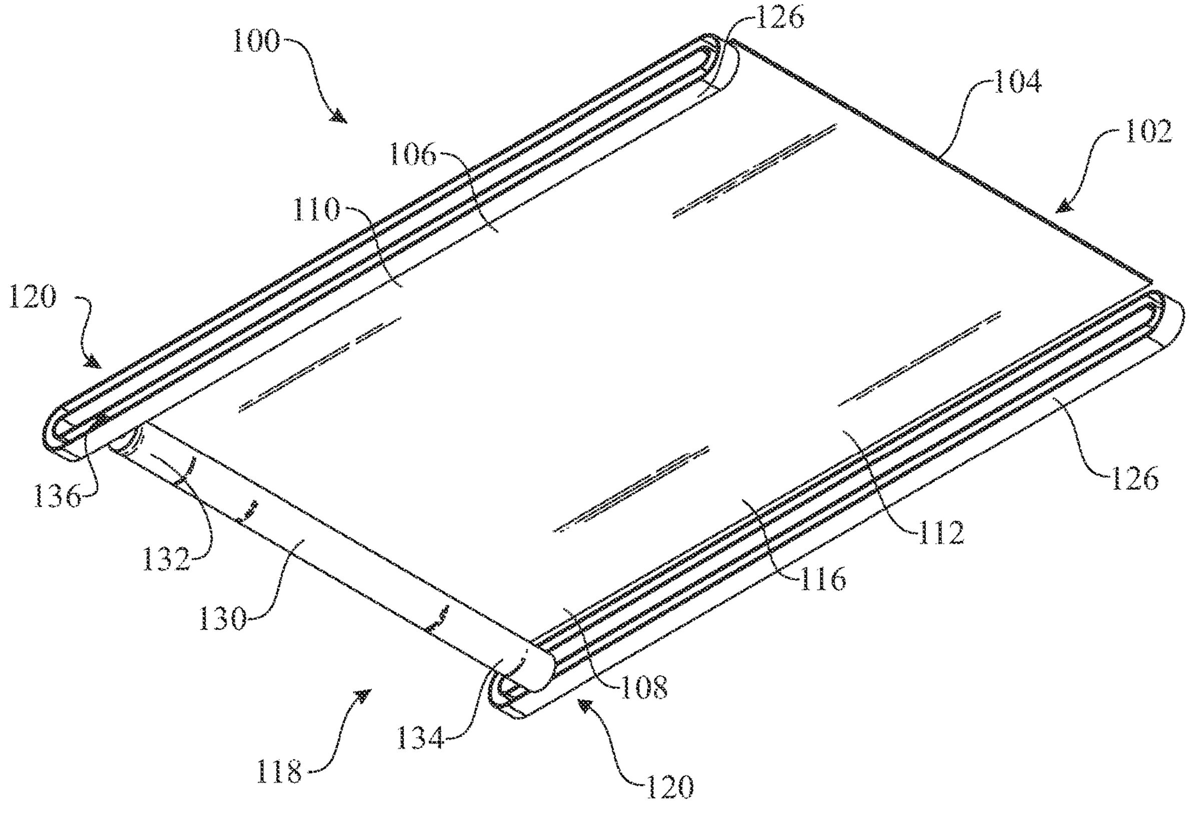
FIG. 2 presents a bottom view of an exemplary embodiment of the mat of the automatic golf ball retrieval system illustrated in FIG. 1, in accordance with the present disclosure.
Figure 3:
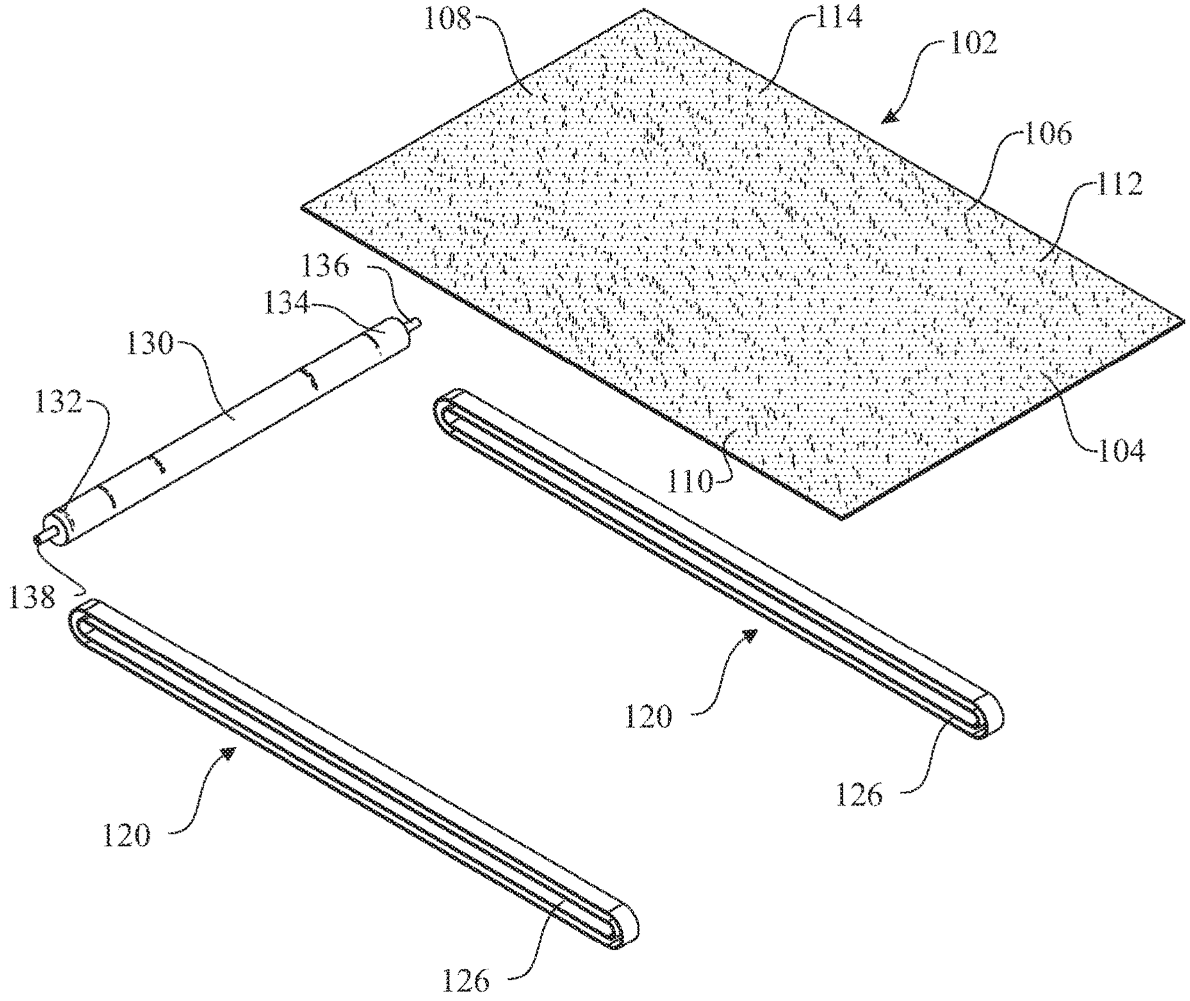
FIG. 3 presents an exploded view of an exemplary embodiment of the mat of the automatic golf ball retrieval system, more particularly illustrating a rolling bar, in accordance with the present disclosure.
Figure 4:
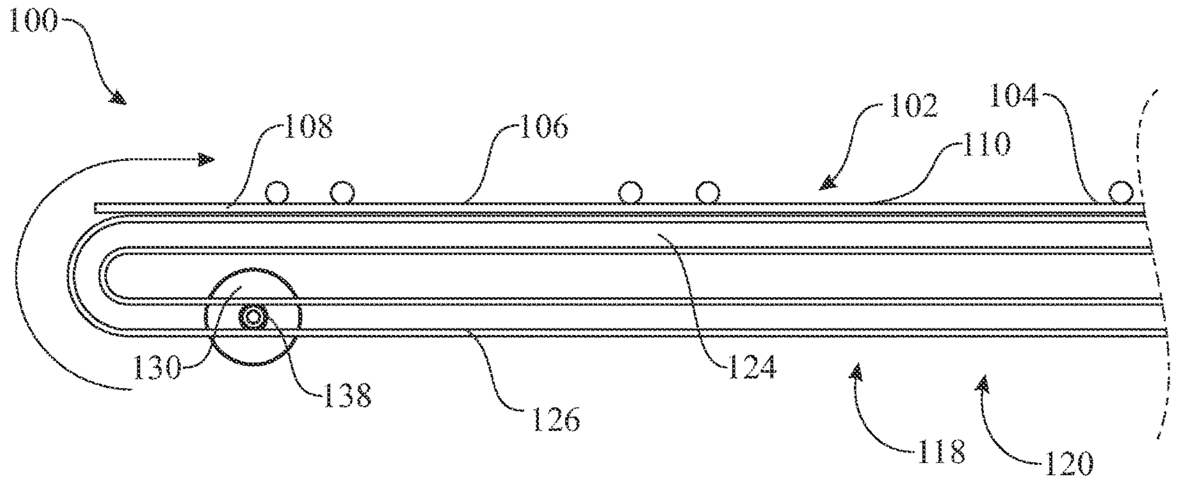
FIG. 4 presents a left side view of an exemplary embodiment of a conveyor belt, more particularly illustrating a portion of a rolling bar moving along the bottom end of one of the steel frames, in accordance with the present disclosure.
Figure 6:
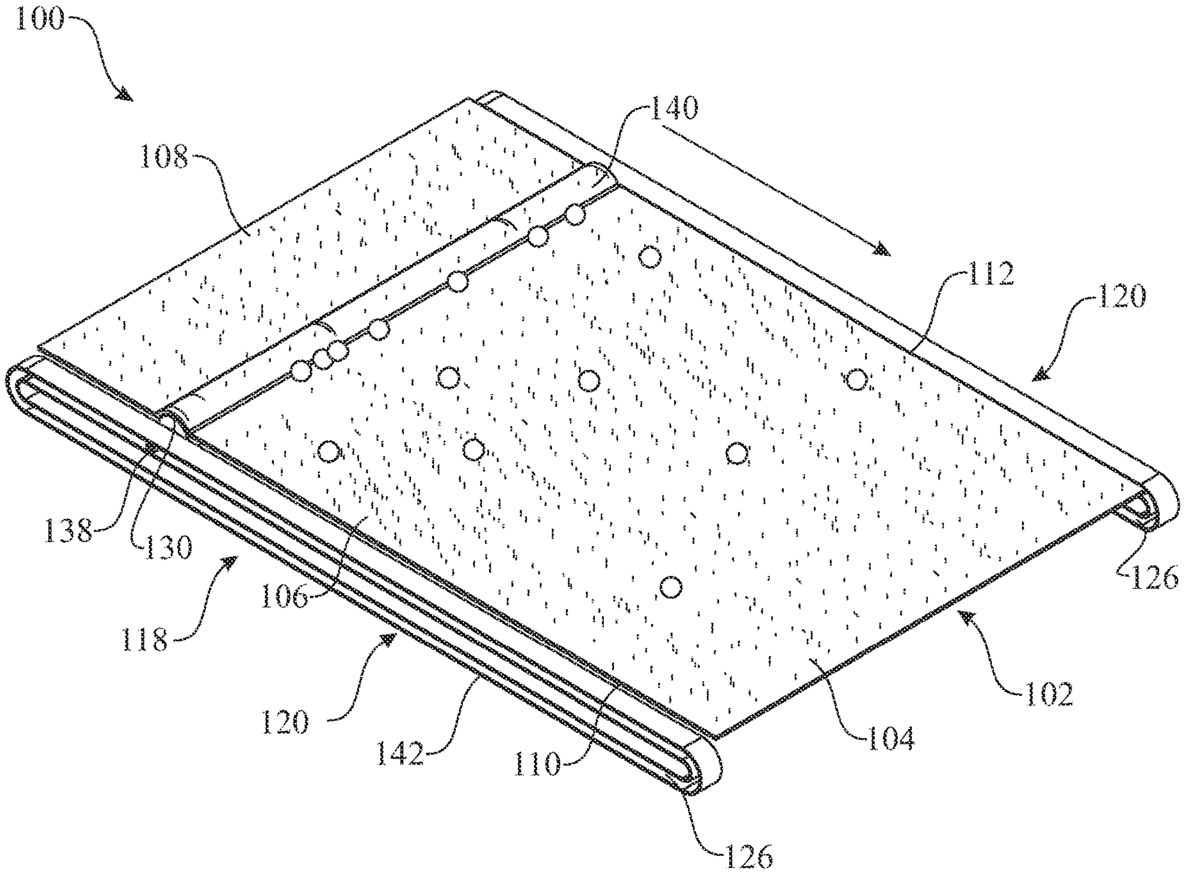
FIG. 6 presents a top perspective view of an exemplary embodiment of the golf ball retrieval system, in accordance with the present disclosure.

An automatic golf ball retrieval system, hereinafter, automatic golf ball retrieval system 100, is illustrated throughout the figures in accordance with a first exemplary embodiment of the present invention. As shown for instance in FIG. 1, the automatic golf ball retrieval system 100 includes a mat 102. The mat 102 may comprise a front portion 104, a middle portion 106, a back portion 108, a leftmost part 110, a rightmost part 112, an exterior face 114 and an interior face 116. As shown in FIGS. 1, 3 and 6, the exterior face 114 of the mat 102 may be made of a material comprising grass, turf, artificial grass, variations and/or combinations thereof.

The automatic golf ball retrieval system 100 may comprise a conveyor belt system 118. The conveyor belt system 118 may comprise at least two frames 120 and a rolling bar 130. Each of the at least two frames 120 can comprise a top end 124 and a bottom end 126. The rolling bar 130 can comprise a left end 132 and a right end 134. A holding pins 136 may be placed at the left end 132 and the right end 134 of the rolling bar 130. At least one wheel 138 may be located on the rolling bar 130. In some embodiments, at least one wheel 138 may be located on the holding pin 136 on the left end 132 of the rolling bar 130 and at least one wheel 138 may be located on the holding pin 136 on the right end 134 of the rolling bar 130. The wheels 138 allow the rolling bar 130 to move along a length of the top end 124 of each of the frames 120 and along a length of the bottom end 126 of each of the frames 120.

Figure 5:
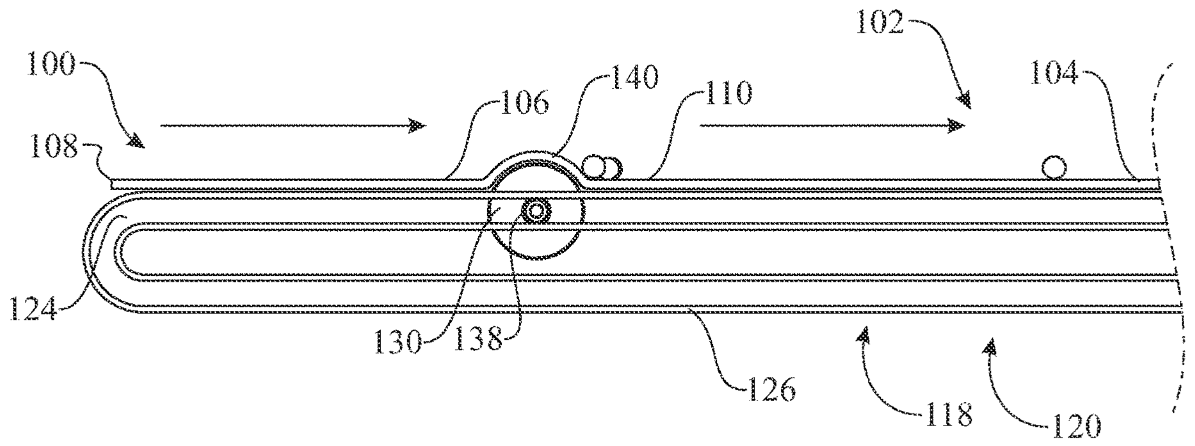
FIG. 5 presents the left side view of an exemplary embodiment of the conveyor belt of FIG. 4, more particularly illustrating the portion of the rolling bar moving along the top end of one of the steel frames and forming a raised surface on the mat in order to engage and push golf balls, in accordance with the present disclosure.

The rolling bar 130 may create a raised surface 140 on the exterior face 114 of the mat 102, as shown best in FIGS. 5 and 6, when the rolling bar 130 contacts the interior face 116 of the mat 102 while moving along the length of the top end 124 of each of the frames 120, which may be made of metal, plastic, steel, wood, or combinations thereof. The raised surface 140 may comprise a length and width that may be identical to a length and width of the rolling bar 130. The width of the raised surface 140 may run from the leftmost part 110 of the mat 102 to the rightmost part 112 of the mat 102. As the rolling bar 130 can move along the length of the top end 124 of each of the frames 120, the raised surface 140 will move from the back portion 108 of the mat 102 to the front portion 104 of the mat 102 and engage and push a plurality golf balls that may be driven onto the exterior face 114 of the mat 102. A base may collect the golf balls that can be moved to the front portion 104 of the mat 102 and may send the golf balls to a cleaning system. The cleaning system may be located underneath the conveyor belt system 118 and may wash the golf balls, not shown, with water and cleaning solutions.

The rolling bar 130 can be a cylindrical shape and the left end 132 of the rolling bar 130 rotatably engages one of the at least two frames 120 and the right end 134 of the rolling bar 130 rotatably engages one the other of the at least two frames 120. The wheels 138 of the rolling bar 130 can rotate and move along a groove inset into the top end 124 and the bottom end 126 of each of the frames 120. When the rolling bar 130 moves along the top end 124 of the frames 120, the rolling bar 130 creates a raised surface 140 which can engage and push any golf balls sitting on the mat 102 to a desired location, such as a golf ball collection area. The rolling bar 130 temporarily displaces the position of the mat 102 by pushing the mat upwards in the direction the rolling bar 130 is rolling, as shown best in FIGS. 6 and 9. The position of the mat 102 can be flat when the rolling bar 130 is not in use. The rolling bar 130 can create a raised surface 140 in the mat 102 when the rolling bar 130 is engaged. When the rolling bar 130 is not in use, the rolling bar 130 can be stopped or be stored on the bottom end 126 of the frames 120. Golf balls may also be moved by the rolling bar 130 lifting the mat 102 upward and allowing gravity to move the golf balls down the lifted mat 102 and toward a golf ball collection area. Once the golf balls are collected from the mat 102, they are moved into a cleaning system and then set on a tee and presented to a golfer to drive the golf ball from the tee.

The cleaning system may be connected to an external placement system that may store the golf balls in a location away from the mat 102 and the conveyor belt system 118. The external placement system may comprise an inner face and an exterior face. In some embodiments, an ejection system may be placed on the exterior face of the external placement system. The ejection system may comprise at least two protrusions. The cleaning system may comprise containers for holding and storing clean water and detergent. The cleaning system may comprise hoses and pipes to allow water to flow through the cleaning system to wash the golf ball. The cleaning system may comprise a waste water management system. The waste water management system may be configured to allow for the cleaning and/or recycling of waste water in the cleaning system. The cleaning system may comprise pumps, a vacuum, a heater, valves, and other standard components found in a waste water management system. The cleaning system may comprise an engine, brushes, sponges, and a means for spinning a brush or a sponge. The cleaning system may comprise a holding apparatus or holding station for a golf ball to keep the gold golf ball stationery in the cleaning system while the golf ball is washed. The cleaning system may comprise a track or guide that allows a golf ball to move through the cleaning system. The cleaning system may comprise a heater to create steam and the golf ball may be cleaned using steam.

In some embodiments the method or methods described above may be executed or carried out by a computing system including a tangible computer-readable storage medium, also described herein as a storage machine, that holds machine-readable instructions executable by a logic machine (i.e., a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. A logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Figure 7:
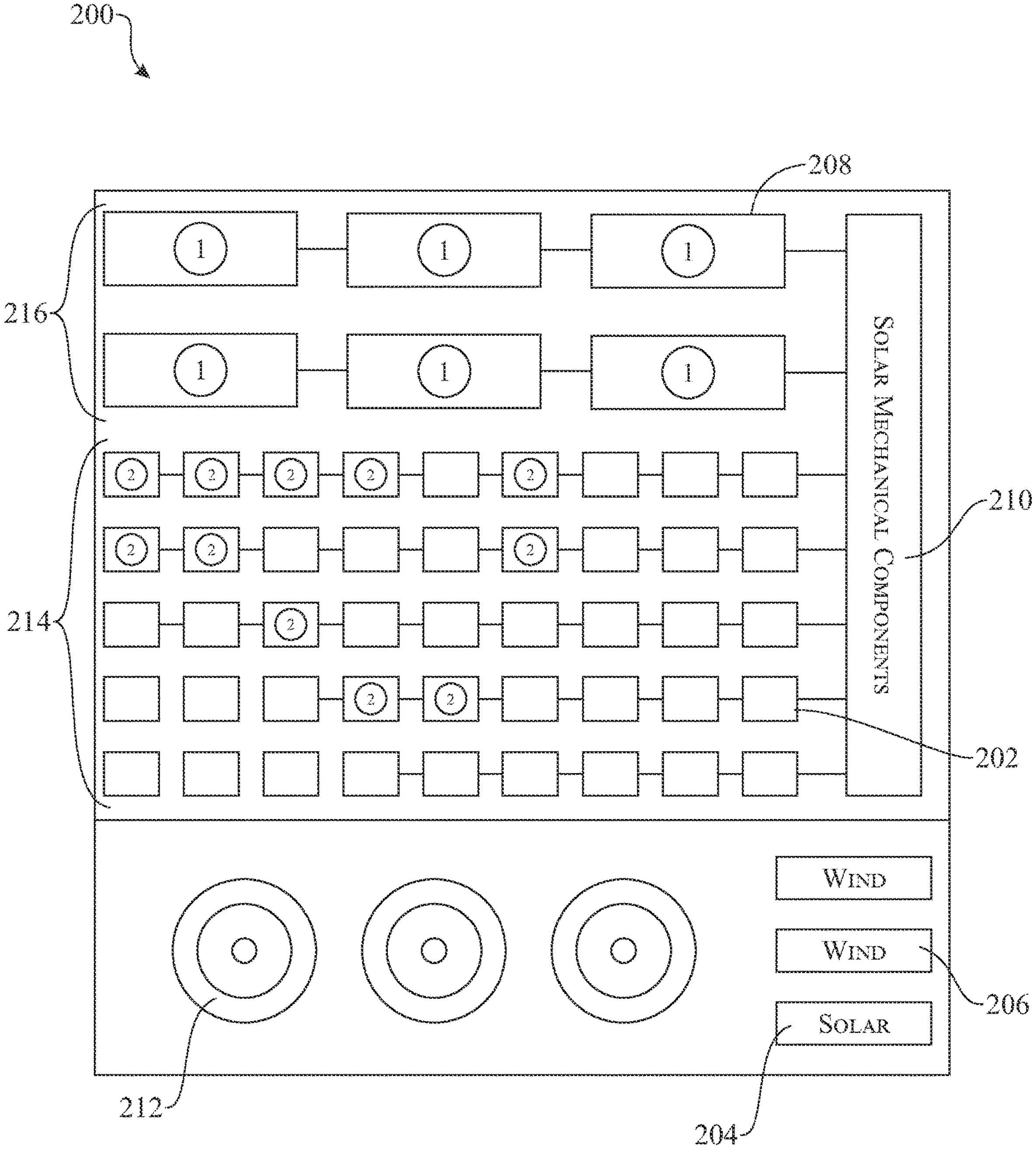
FIG. 7 presents an overview of an exemplary embodiment of an energy system for an automatic golf ball retrieval system, in accordance with the present disclosure.

Turning to FIG. 7, the computing system may be electrically connected to an energy system 200 comprising at least one battery 202 to power the golf ball retriever system 100. The at least one battery 202 is electrically connected to at least one solar mechanical component 210 as a means to recharge the battery 202. The at least one solar mechanical component 210 may be comprised of at least one solar panel 204, and/or at least one wind turbine 206, as a means to recharge the at least one battery 202. In another embodiment, the computing system is further connected to the at least one solar mechanical component 210, as a power source to the computing system, and as a means to recharge the at least one battery 202. The at least one solar panel 204 can be mounted on a pivoting post to permit the at least one solar panel 204 to be positioned towards the sun throughout the day. The at least one solar panel 204 collects photons to store and use to power the automatic golf ball retrieval system 100. The solar mechanical component 204 can comprise an inverter for converting photons into electricity. Solar power systems can comprise a core set of components, such as solar panels, inverters. AC/DC disconnects, meters, wiring, racking and mounting, if the solar power system is grid-tied. If the solar power system is off-grid, it may require additional components, such as charge controllers, batteries, additional balance of systems items and more.

The computing system can be electrically connected to at least one backup generator 208. The at least one backup generator 208 may have a means for storing electricity. The backup generator 208 can be connected to a golf ballast system. In another embodiment the at least one backup generator 208 can be electrically connected to the at least one solar mechanical component 210.

The automatic golf ball retrieval system 100 may further comprise a geothermal system 212 for heating and cooling water. The geothermal system 212 may be electrically connected to at least one solar mechanical component 210 and/or backup generator 208 and/or at least one battery 202.

Figure 8:
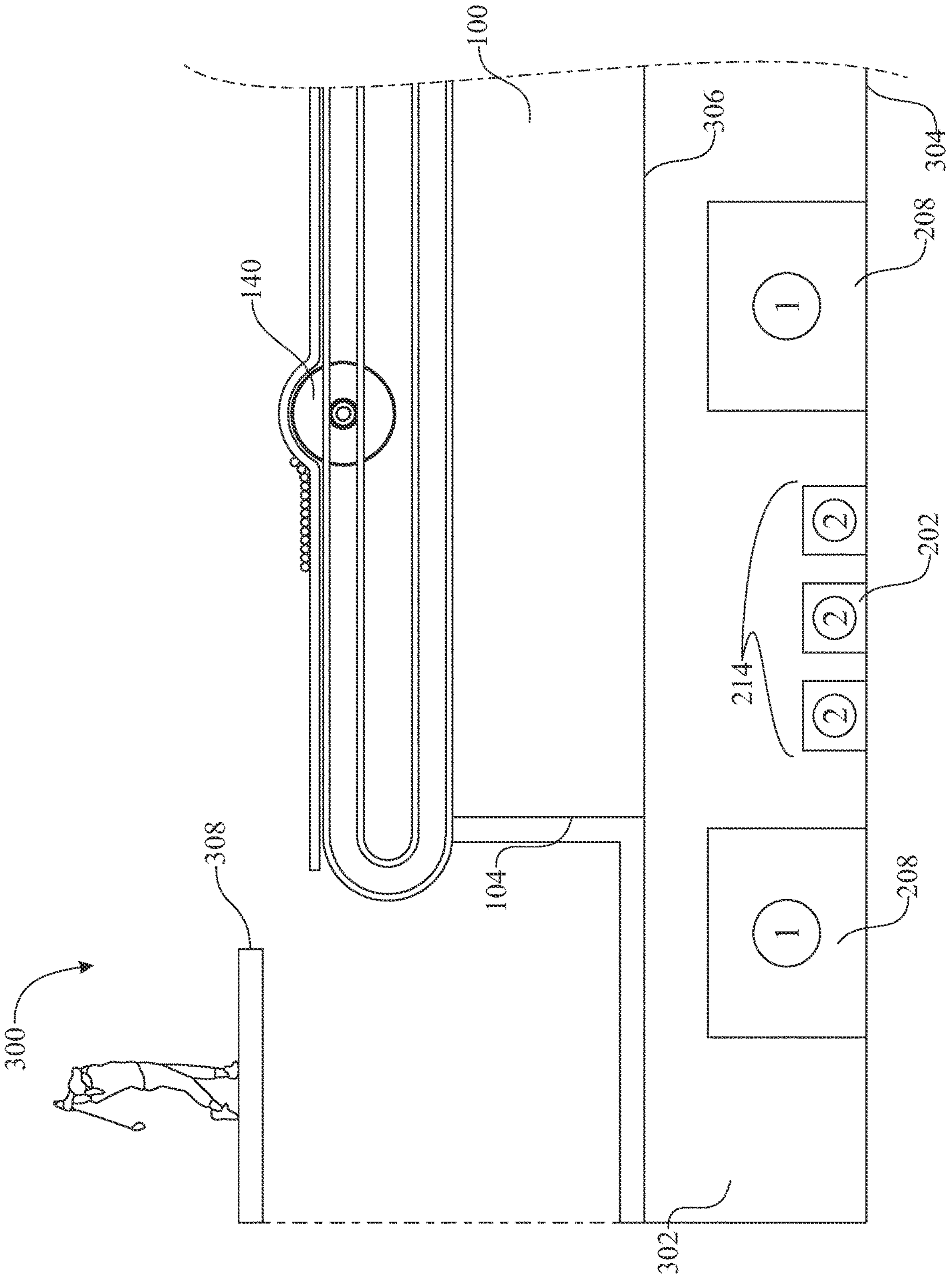
FIG. 8 presents a side view of an exemplary embodiment of an automatic golf ball retrieval system at a golf driving range illustrating a portion of an energy system and a rolling bar moving along the mat and forming a raised surface on the mat in order to engage and push golf balls toward a golf tee platform, in accordance with the present disclosure.

A plurality of batteries 202 can be connected to form a series of batteries 214 as depicted in FIG. 7. Additionally, one may connect a plurality of backup generators 208 to form a series of backup generators 216, also depicted in FIG. 7. The series of batteries 214 and/or series of backup generators 216 may be installed in a housing 302 underground, as depicted in FIG. 8. The housing 302 can comprise a floor 304 and a ceiling 306. There is an advantage for maintaining climate control by installing the at least one battery 202 and at least one backup generator 208 underground in the housing 302. The housing 302 may be the length and width of the golf ball retriever system 100 or larger than the length and width of the automatic golf ball retrieval system 100. The golf ball retriever system 100 may be placed above the ceiling 306. A golf tee platform 308 may be situated above the ceiling 306. The golf tee platform 308 may be ground level near the front portion 104 or elevated above the front portion 104 of the automatic golf ball retrieval system 100. The golf tee platform 308 may be the entire width of the automatic golf ball retrieval system 100.

Figure 9:
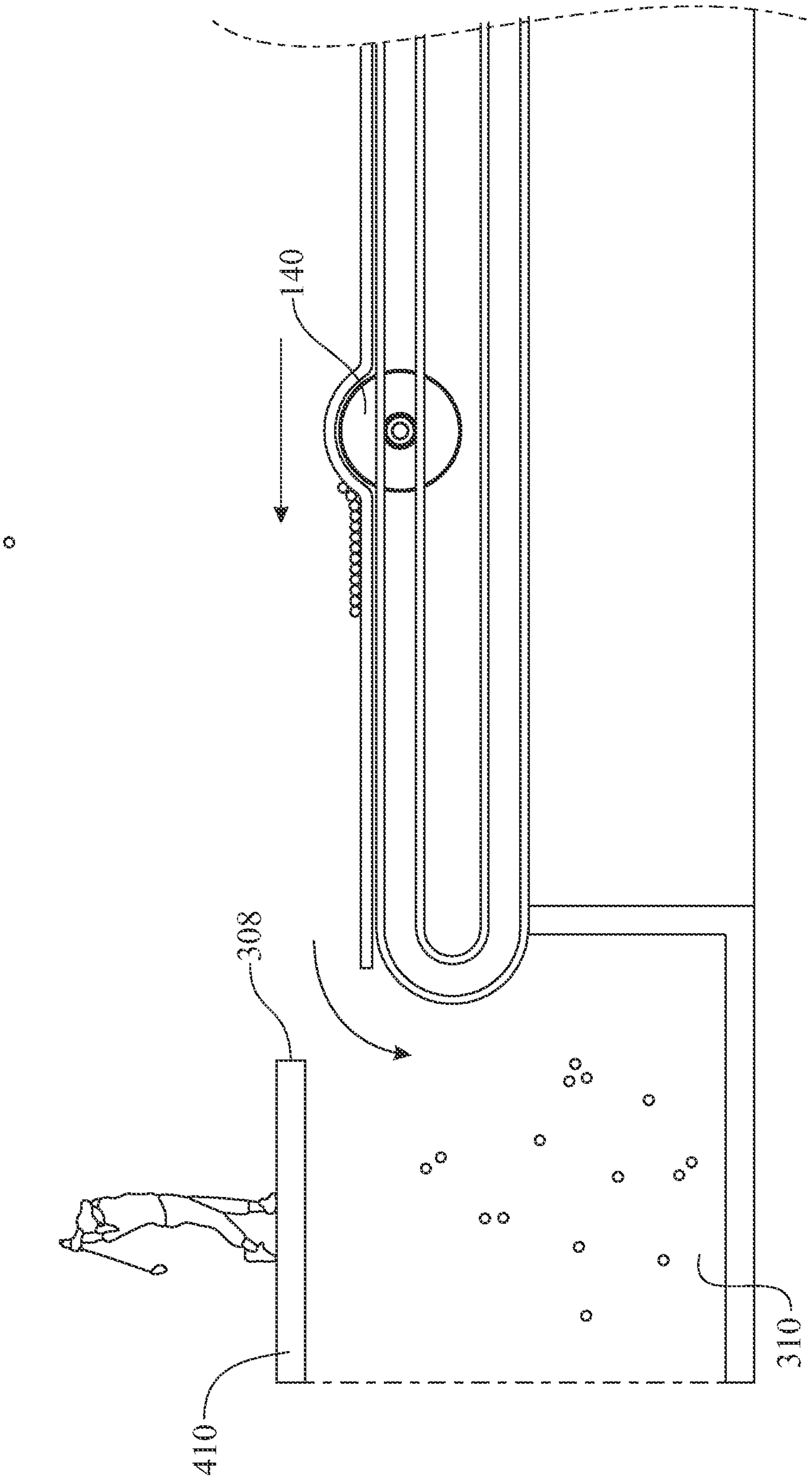
FIG. 9 presents a side view of an exemplary embodiment of an automatic golf ball retrieval system at a golf driving range illustrating a portion of the holding tank, in accordance with the present disclosure.

Referring to FIG. 9, a holding tank 310 may be situated below the golf tee platform 308 which stores the golf balls retrieved by the automatic golf ball retrieval system 100. The holding tank 310 may comprise of a washing tank 402, a rinse tank 404 and a dry tank 406. The washing tank 402 washes the retrieved golf balls, the rinse tank 404 rinses the washed golf balls, and the dry tank 406 dries the rinsed golf balls.

Figure 10:
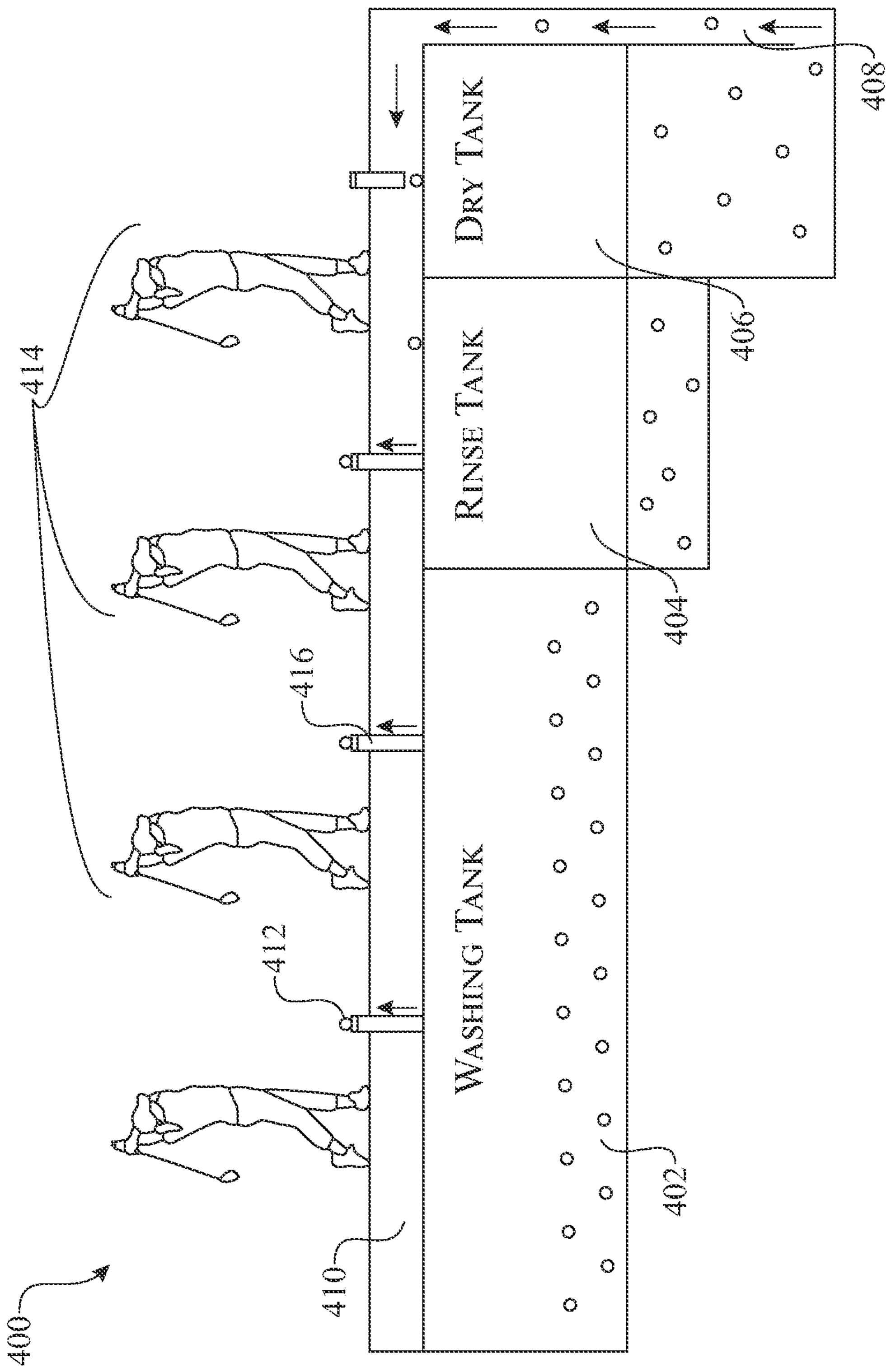
FIG. 10 presents a posterior view of an exemplary embodiment of a golf tee platform for golfers to stand on above a golf ball holding tank, more particularly illustrating a cleaning system, a chute to transfer golf balls from the holding tank to the golf tee platform for the golf ball to be set by an automatic tee setter, in accordance with the present disclosure.

Referring to FIG. 10, the golf balls collected by the holding tank 310 may be washed in the wash tank 402, rinsed in the rinse tank 404, and dried in the dry tank 406. The holding tank 310 may be connected to an automatic tee setter system 400 comprising of an air chute 408, a golf ball lane 410, and an automatic tee setter 412. The air chute 408 transfers the washed, rinsed, and dried golf balls from the dry tank 406 to the golf ball lane 410. The golf ball lane 410 can be situated below the golf tee platform 308. The golf ball lane 410 may be connected to the automatic tee setter 412. The automatic tee setter system 400 may be connected to the golf tee platform 308. The golf tee platform 308 may be divided into at least one golf tee lane 414 or a plurality of golf tee lanes 414. The at least one golf tee lane 414 comprises a hole 416. The automatic tee setter 412 sets a golf ball on a tee by transferring a golf ball, which may be performed by mechanical operation or by gravity, contained in the golf ball lane 410 through the hole 416 in the at least one golf tee lane 414 for the golfer to swing a golf club at the golf ball and onto the mat 102. The automatic tee setter 412 may comprise tracks, pipes, guides, a variant thereof, or combination thereof. The tracks, pipes, guides, or variants thereof can allow the golf ball to roll along said track, pope, guide, or variant thereof and into position to be placed on a tee and presented to a golfer. The automatic tee setter 412 may comprise a golf ball grabbing device that clasps or sucks the golf ball into a cavity or indent in the golf ball grabbing device and places the golf ball onto the tee. The automatic tee setter 412 may comprise electronics made up of components necessary to create electrical circuits, such as wires, circuit boards, switches, transistors, resistors, inductors, diodes, or other electrical components necessary to create an electrical circuit to power the automatic tee setter.

The automatic golf ball retrieval system 100 may comprise electrical and mechanical components to allow the automatic golf ball retrieval system 100 to operate. The electrical components may be components necessary to create electrical circuits, such as wires, circuit boards, switches, transistors, resistors, inductors, diodes, or other electrical components necessary to create an electrical circuit to power the automatic golf ball retrieval system 100. The mechanical components may be components necessary to allow the mechanical mechanisms and to allow the automatic golf ball retrieval system 100 to work as described in this disclosure. The mechanical components may be pipes, guides, tracks, strings, springs, conveyor belts, water holding tanks, detergent dispensers or holding tanks, fasteners, heaters, coolers, valves, pumps, vacuums, brackets, hardware, and other mechanical components.

The embodiments in this disclosure may require electrical connections, wiring, power sources, power switches, mechanical pumps, mechanical engines, and other components that are known to be necessary when building the apparatus taught in this disclosure.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An automatic golf ball retrieval system retrieves a plurality of golf balls hit by at least one golfer towards a driving area of a driving range, said system comprising:

a mat dimensioned and configured to receive the plurality of golf balls hit by the at least one golfer on the driving range, said mat comprising an exterior face and an interior face;

a conveyor belt system comprising:

at least one frame having an upper end and a lower end;

a rolling bar having oppositely disposed ends comprising at least one wheel mounted to one of said oppositely disposed ends thereby allowing said rolling bar to move along said upper end and said lower end of said at least one frame; and said rolling bar contacts said interior face of said mat while said rolling bar moves along said upper end of said at least one frame thereby forming a raised surface on said exterior face of said mat which engages and pushes the plurality of golf balls toward a holding tank into which the plurality of golf balls are transferred:

a cleaning system disposed in communication with said holding tank comprising which receives the plurality of golf balls from said holding tank and cleans the plurality of golf balls therein;

an automatic tee setter system comprising an air chute which transfers the plurality of golf balls from said cleaning system; and said automatic tee setter positions each of the plurality of golf balls onto a different one of a plurality of golf tees disposed on a golf tee platform.

2. The automatic golf ball retrieval system as recited in claim 1, wherein said mat further comprises a front portion, a middle portion, a back portion, a leftmost side and a rightmost side.

3. The automatic golf ball retrieval system as recited in claim 1, wherein said mat is dimensioned and configured to substantially overlie the driving area of the driving range.

4. The automatic golf ball retrieval system as recited in claim 1, further comprising a plurality of oppositely disposed frames each having an upper end and a lower end.

5. The automatic golf ball retrieval system as recited in claim 4, wherein said rolling bar comprising a plurality of wheels each mounted to a different one of said oppositely disposed ends thereof, thereby allowing said rolling bar to move along said upper end and said lower end of each of said plurality of oppositely disposed frames.

6. The automatic golf ball retrieval system as recited in claim 4, wherein said roller bar comprises a holding pin affixed to each of said oppositely disposed ends.

7. The automatic golf ball retrieval system as recited in claim 6, wherein said rolling bar comprising a plurality of wheels each mounted to a different one of said holding pins affixed to each of said oppositely disposed ends thereof, thereby allowing said rolling bar to move along said upper end and said lower end of each of said plurality of oppositely disposed frames.

8. The automatic golf ball retrieval system as recited in claim 1, wherein said roller bar comprises an elongated configuration.

9. The automatic golf ball retrieval system as recited in claim 1, wherein said roller bar extends substantially from one side of said mat to an oppositely disposed side of said mat.

10. The automatic golf ball retrieval system as recited in claim 1, wherein said cleaning system comprises a washing tank, the plurality of golf balls are washed in said washing tank.

11. The automatic golf ball retrieval system as recited in claim 1, wherein said cleaning system comprises a rinsing tank, the plurality of golf balls are rinsed in said rinsing tank.

12. The automatic golf ball retrieval system as recited in claim 1, wherein said cleaning system comprises a dry tank, the plurality of golf balls are dried in said dry tank.

13. The automatic golf ball retrieval system as recited in claim 1, further comprising an energy system which provides electrical energy to operate said automatic golf ball retrieval system.

14. The automatic golf ball retrieval system as recited in claim 13, wherein said energy system comprises at least one of a battery, a backup generator or a solar mechanical component.

15. The automatic golf ball retrieval system as recited in claim 14, wherein said solar mechanical component comprises at least one solar panel.

16. The automatic golf ball retrieval system as recited in claim 14, wherein said solar mechanical component comprises at least one wind turbine.

17. The automatic golf ball retrieval system as recited in claim 1, further comprising a computing system which controls and automates operation of said automatic golf ball retrieval system.

18. The automatic golf ball retrieval system as recited in claim 1, wherein said computing system receives electrical energy from an energy system.

19. An automatic golf ball retrieval system retrieves a plurality of golf balls hit by at least one golfer towards a driving area of a driving range, said system comprising:

a mat dimensioned and configured to receive the plurality of golf balls hit by the at least one golfer on the driving range, said mat comprising an exterior face, an interior face and oppositely disposed sides;

a conveyor belt system comprising:

a plurality of oppositely disposed frames each comprising an upper end and a lower end;

a rolling bar having oppositely disposed ends comprising an elongated configuration extending substantially between said oppositely disposed sides of said mat;

said rolling bar comprising a wheel mounted to each of said oppositely disposed ends thereof, thereby allowing said rolling bar to move along said upper end and said lower end of each of said plurality of oppositely disposed frames; and said rolling bar contacts said interior face of said mat while said rolling bar moves along said upper end of each of said plurality of oppositely disposed frames thereby forming a raised surface on said exterior face of said mat which engages and pushes the plurality of golf balls towards a holding tank into which the plurality of golf balls are transferred;

a cleaning system disposed in communication with said holding tank comprising a washing tank, a rinsing tank and a dry tank which receives the plurality of golf balls from said holding tank and cleans the plurality of golf balls therein; and an automatic tee setter system comprising an air chute which transfers the plurality of golf balls from said dry tank of said cleaning system, said automatic tee setter positions each of the plurality of golf balls onto a different one of a plurality of golf tees disposed on a golf tee platform.

20. An automatic golf ball retrieval system retrieves a plurality of golf balls hit by at least one golfer towards a driving area of a driving range, said system comprising:

a mat dimensioned and configured to receive the plurality of golf balls hit by the at least one golfer on the driving range, said mat comprising an exterior face, an interior face and oppositely disposed sides;

a conveyor belt system comprising:

a plurality of oppositely disposed frames each comprising an upper end and a lower end;

a rolling bar having oppositely disposed ends comprising an elongated configuration extending substantially between said oppositely disposed sides of said mat;

said rolling bar comprising a wheel mounted to each of said oppositely disposed ends thereof, thereby allowing said rolling bar to move along said upper end and said lower end of each of said plurality of oppositely disposed frames; and said rolling bar contacts said interior face of said mat while said rolling bar moves along said upper end of each of said plurality of oppositely disposed frames thereby forming a raised surface on said exterior face of said mat which engages and pushes the plurality of golf balls towards a holding tank into which the plurality of golf balls are transferred;

a cleaning system disposed in communication with said holding tank comprising a washing tank, a rinsing tank and a dry tank which receives the plurality of golf balls from said holding tank and cleans the plurality of golf balls therein;

an automatic tee setter system comprising an air chute which transfers the plurality of golf balls from said dry tank of said cleaning system, said automatic tee setter positions each of the plurality of golf balls onto a different one of a plurality of golf tees disposed on a golf tee platform;

a computing system which controls and automates operation of said automatic golf ball retrieval system; and an energy system comprises at least one of a battery, a backup generator or a solar mechanical component which provides electrical energy to operate said automatic golf ball retrieval system.

* * * * *